(12) United States Patent
Yumoto

(10) Patent No.: US 6,244,829 B1
(45) Date of Patent: *Jun. 12, 2001

(54) LIQUID FORCED-FEED APPARATUS

(75) Inventor: Hideaki Yumoto, Kakogawa (JP)

(73) Assignee: TLV Co. Ltd., Kakogawa (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/093,895

(22) Filed: Jun. 9, 1998

(30) Foreign Application Priority Data

| Jun. 13, 1997 | (JP) | 9-172809 |
| Dec. 15, 1997 | (JP) | 9-363452 |
| Feb. 13, 1998 | (JP) | 10-048698 |
| Feb. 13, 1998 | (JP) | 10-048699 |
| Feb. 13, 1998 | (JP) | 10-048700 |
| Feb. 13, 1998 | (JP) | 10-048701 |

(51) Int. Cl.[7] .................................... F04F 1/06
(52) U.S. Cl. .................. 417/133; 417/132; 137/165; 137/202; 137/410; 137/413; 4/67; 4/325; 261/73; 74/100.1
(58) Field of Search .................. 417/133, 132; 137/413, 202, 165, 416, 410; 74/100.1; 261/73; 4/325, 67

(56) References Cited

U.S. PATENT DOCUMENTS

| Re. 34,957 | * | 5/1995 | Francart, Jr. | 417/133 |
| 1,132,942 | * | 3/1915 | Jay | 261/73 |
| 1,699,464 | * | 1/1929 | Dutcher | 137/165 |
| 3,988,786 | * | 11/1976 | Lehfeldt | 4/67 |
| 4,299,248 | * | 11/1981 | Becker et al. | 137/202 |
| 4,436,109 | * | 3/1984 | Taylor | 137/413 |
| 5,141,405 | * | 8/1992 | Francart, Jr. | 417/133 |
| 5,211,204 | * | 5/1993 | Mikol | 137/410 |
| 5,230,361 | * | 7/1993 | Carr et al. | 137/416 |
| 5,265,282 | * | 11/1993 | Schmucki | 4/325 |
| 5,426,990 | * | 6/1995 | Francart, Jr. | 74/100.1 |
| 5,655,888 | * | 8/1997 | Yumoto | 417/132 |
| 5,934,881 | * | 8/1999 | Yumoto | 417/133 |
| 5,938,409 | * | 8/1999 | Radle, Jr. et al. | 417/133 |
| 5,941,691 | * | 8/1999 | Stephens | 417/133 |

FOREIGN PATENT DOCUMENTS

| 314 3284 | * | 5/1983 | (DE) . |
| 715 046 | * | 6/1996 | (EP) . |
| 1 389 045 | * | 4/1975 | (GB) . |
| 127 5410 | * | 12/1986 | (RU) . |
| 2012923 | * | 5/1994 | (RU) . |

* cited by examiner

Primary Examiner—Charles G. Freay
Assistant Examiner—Steven Brown
(74) Attorney, Agent, or Firm—Kenyon & Kenyon (57) ABSTRACT

A liquid forced-feed apparatus has a built-in float in a hermetic vessel provided with a working fluid inlet port, a working fluid discharge port, a forced-feed liquid inlet port, and a forced-feed liquid discharge port. A snap mechanism which is actuated to operate the working fluid inlet port and the working fluid discharge port with the upward and downward strokes of the float, to thereby force a liquid in the hermetic vessel out through the forced-feed liquid discharge port. A power transmitting shaft for transmitting the upward-and-downward movement of the float to the snap mechanism extends out of the hermetic vessel. The snap mechanism is disposed outside of the hermetic vessel.

33 Claims, 8 Drawing Sheets

LIQUID FORCED-FEED APPARATUS

BACKGROUND OF THE INVENTION

1. Field of the Invention

The present invention relates to a liquid forced-feed apparatus for feeding a liquid, such as water, fuel, etc., under pressure. The liquid forced-feed apparatus of the present invention is suitable particularly for use in collecting a condensate generated in a steam piping system and feeding this condensate to a boiler or a waste heat recovery system.

2. Description of the Prior Art

Condensate generated in a steam piping system in most cases still has a considerable quantity of stored waste heat. For this reason, it has been a widespread practice to use a condensate recovery system, including a liquid forced-feed apparatus, to recover the condensate and feed it into a boiler or waste heat recovery system. Such a system is designed for the utilization of waste heat from the condensate, thus realizing the effective use of this energy.

The liquid forced-feed apparatus used in prior art condensate recovery systems collects condensate in a hermetic vessel, and introduces a high-pressure working fluid, such as steam, into the hermetic vessel by operating a change-over valve, thereby forcing the condensate from the inside of the hermetic vessel under the pressure of the working fluid.

To ensure high-efficiency operation of the liquid forced-feed apparatus, it is necessary to hold as much condensate as possible in the hermetic vessel and to properly switch the change-over valve. The liquid forced-feed apparatus of the prior art, therefore, generally uses a snap mechanism in order to ensure reliable switching of the change-over valve.

Figure 1:
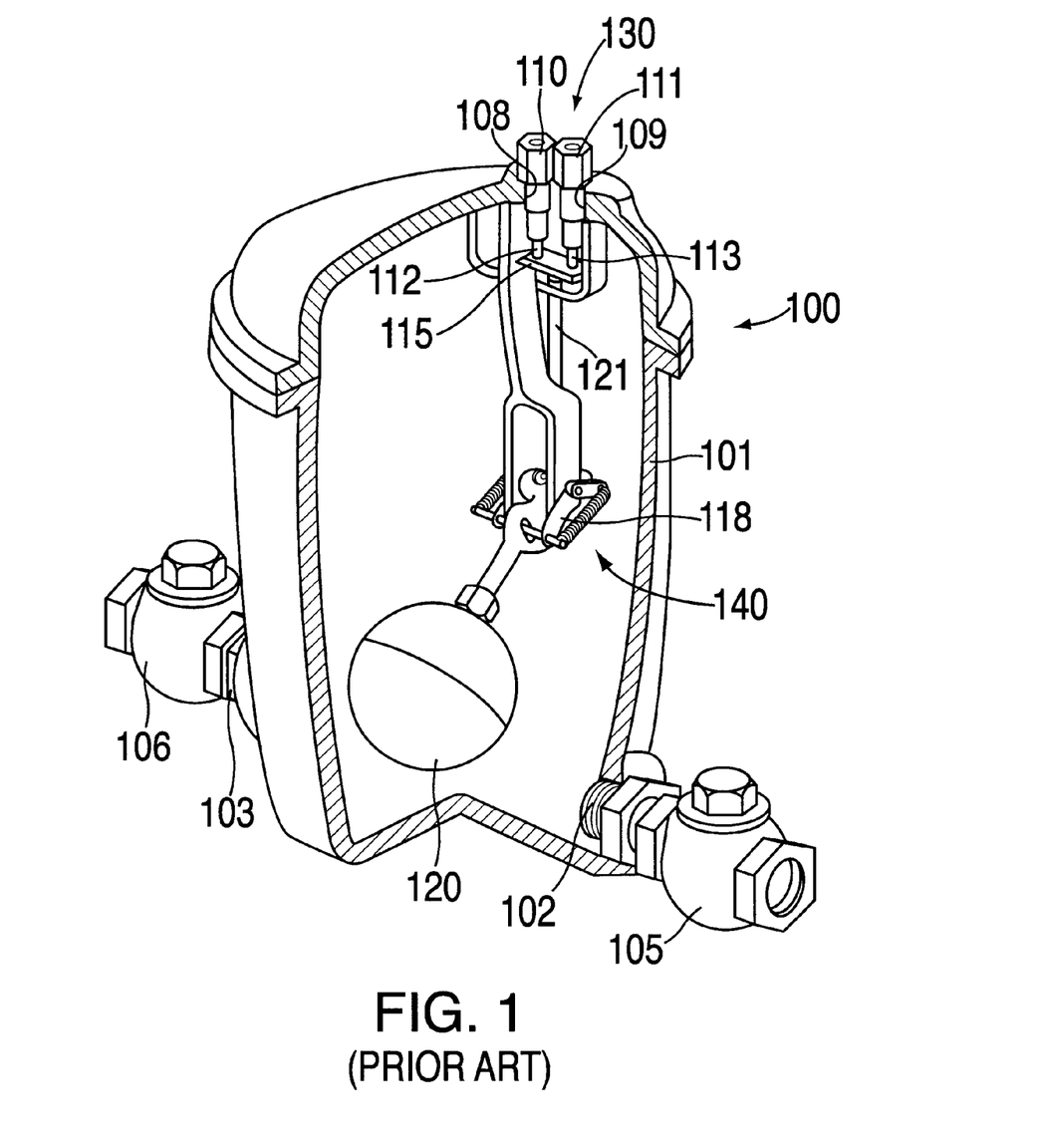
FIG. 1 is a partial sectional view, in perspective, of a prior art liquid forced-feed apparatus.

FIG. 1 is a partly sectional perspective view of the type of liquid forced-feed apparatus disclosed in the prior art. The liquid forced-feed apparatus of FIG. 1 has a hermetic vessel 101, and contains a float 120, a changeover valve 130, and a snap mechanism 140. The hermetic vessel 101 is provided with a forced-feed liquid inlet port 102 and a forced-feed liquid discharge port 103 in the vicinity of the bottom, which are fitted with check valves 105 and 106, respectively. The check valve 105 is mounted in a direction such that the condensate is allowed to flow into the hermetic vessel 101, while the check valve 106 is mounted in a direction such that the condensate is allowed to be forced out from the hermetic vessel 101.

In the top of the hermetic vessel 101 are formed a working fluid inlet port 108 and a working fluid discharge port 109, which are fitted with a supply valve 110 and an exhaust valve 111, respectively. The supply valve 110 and the exhaust valve 111, which together form the changeover valve 130, are opened and closed by up and down movement of the valve lifting rods 112 and 113, respectively. The supply valve 110 is opened when the valve lifting rod 112 is up, while the exhaust valve 111 is closed when the valve lifting rod 113 is up. The valve lifting rods 112 and 113 are connected in parallel by a connecting plate 115. The supply valve 110 and the exhaust valve 111 are thus simultaneously opened and closed by moving the connecting plate 115 up and down.

In the prior art liquid forced-feed apparatus of FIG. 1, the forced-feed liquid inlet port 102 is connected to a load of steam via the check valve 105, and the forced-feed liquid discharge port 103 is connected to a boiler, and an apparatus utilizing waste heat, via the check valve 106. The working fluid inlet port 108 is connected to a high-pressure fluid source. When no condensate is present in the hermetic vessel 101, the float 120 is in the lower position and the connecting plate 115 is down, causing the supply valve 110 to close the working fluid inlet port 108 and the exhaust valve 111 to open the working fluid discharge port 109.

If condensate is generated in the load of steam connected to the liquid forced-feed apparatus of FIG. 1, the condensate flows into and gathers in the hermetic vessel 101 via the check valve 105. With an increase in the amount of the condensate, the float 120 rises, causing one end of the arm 118 to rise. If the arm 118 rises over a predetermined level, a snap mechanism 140 turns over to raise the valve stem operating rod 121, thereby raising the connecting plate 115. As the connecting plate 115 rises, the supply valve 110 opens the working fluid inlet port 108 and the exhaust valve 111 closes the working fluid discharge port 109. The pressure in the hermetic vessel 101 then increases, forcing the condensate under pressure out of the forced-feed liquid discharge port 103 via the check valve 106.

SUMMARY OF THE INVENTION

The prior art liquid forced-feed apparatus is of a simple construction and is capable of forcing the liquid comparatively efficiently. The snap mechanism, however, being disposed inside the hermetic vessel, is likely to accumulate foreign substances present in the fluids, such as dirt and scale, which will prevent smooth operation.

In view of the above-described problems inherent in the known prior art apparatus, it is an object of the present invention to provide a liquid forced-feed apparatus which operates smoothly.

The present invention is a liquid forced-feed apparatus provided with a hermetic vessel which has a working fluid inlet port, a working fluid discharge port, a forced-feed liquid inlet port, and a forced-feed liquid discharge port. Within the hermetic vessel is a float and a change-over valve and outside the hermetic vessel is a snap mechanism. The liquid forced-feed apparatus of the present invention is characterized by a power transmitting shaft which extends out of the hermetic vessel and transmits the up and down movement of the float to the snap mechanism. As the float moves up and down, the snap mechanism opens and closes the working fluid inlet port and working fluid discharge port, causing the liquid to be forced out of the hermetic vessel through the forced-feed liquid discharge port.

In the liquid forced-feed apparatus of the present invention, the shaft for transmitting the up and down movement of the float to the snap mechanism extends out of the hermetic vessel and the snap mechanism is disposed outside of the hermetic vessel. The snap mechanism can therefore operate without being affected by foreign substances in the hermetic vessel.

BRIEF DESCRIPTION OF THE DRAWINGS

The above-mentioned features, and other objects, features, and advantages of the present invention will become more apparent by reference to the following description of the preferred embodiments of the invention, taken in conjunction with the accompanying drawings, in which.

DESCRIPTION OF THE PREFERRED EMBODIMENTS

Figure 2:
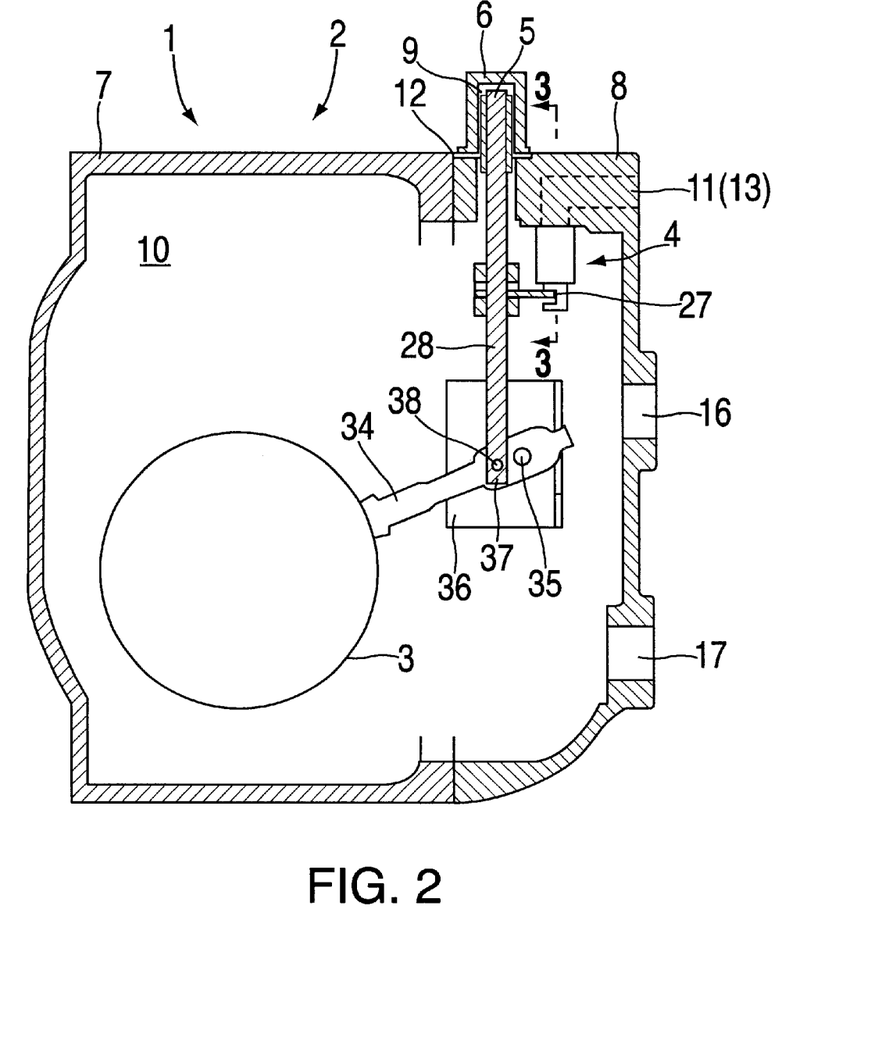
FIG. 2 is a sectional view of a liquid forced-feed apparatus according to the present invention.

In FIG. 2, the liquid forced-feed apparatus of a first embodiment of the present invention has a float 3 and a changeover valve 4 arranged in a liquid holding space 10. The liquid holding space 10 is created inside hermetic vessel 2 by a body section 7 and a cover section 8 connected by screws (not shown). A cap 6 is connected to the cover section 8 with screws (not shown) and a gasket 12 is interposed between the cover section 8 and the cap 6 to maintain airtightness. A snap mechanism 5 is disposed in an outside space 9 between the cover section 8 and the cap 6. The cover section 8 is provided with four openings: a working fluid inlet port 11, a working fluid discharge port 13, a forced-feed liquid inlet port 16, and a forced-feed liquid discharge port 17.

Figure 3:
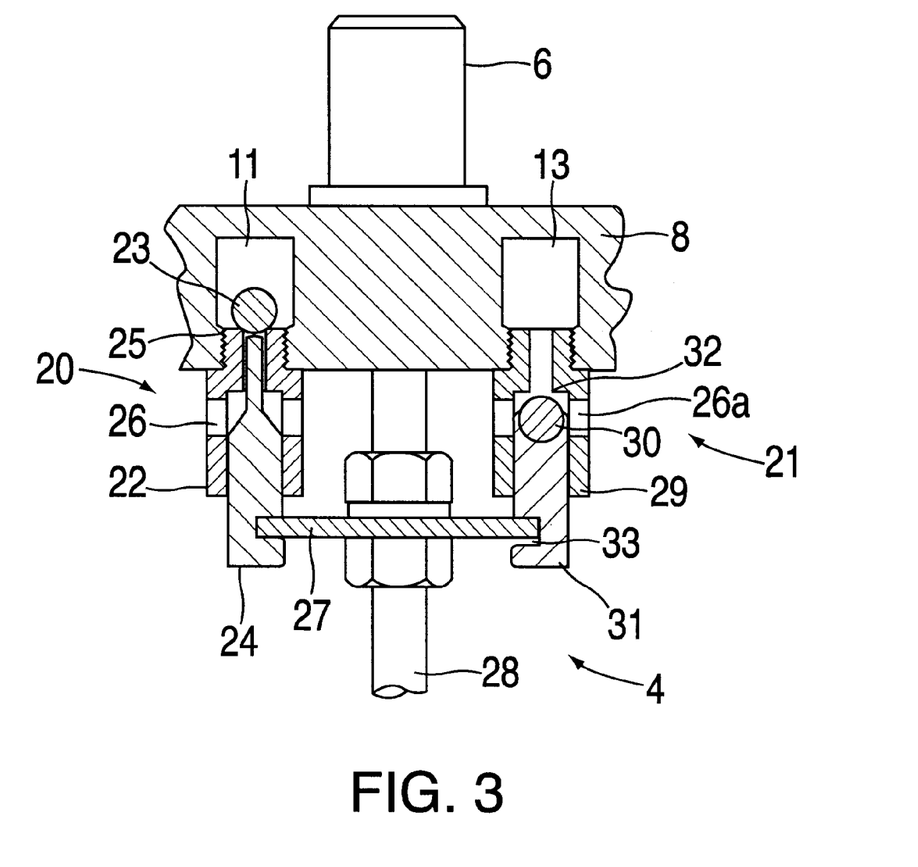
FIG. 3 is an enlarged sectional view taken along line A—A of FIG. 2.

As shown in the enlarged sectional view in FIG. 3, a supply valve 20 is mounted inside the working fluid inlet port 11, and an exhaust valve 21 is mounted inside the working fluid discharge port 13.

The supply valve 20 includes a valve case 22, a valve body 23, and a valve lifting rod 24. The valve case 22 has a through hole provided in an axial direction; the upper end of the through hole functions as a valve seat 25. In the intermediate part of the valve case 22 four openings 26 connecting the through hole with the liquid holding space 10 are provided. The valve body 23 is spherical in shape and located on the working fluid inlet port 11 side of the valve case 22. The forward end of the valve case 22 is screwed into the working fluid inlet port 11. The valve lifting rod 24 is inserted in the through hole provided in the valve case 22 and is connected with a connecting plate 27 by a slot formed in the lower end portion of the valve lifting rod 24. The connecting plate 27 is connected to the power transmitting shaft 28. The forward end of the valve lifting rod 24 contacts the valve body 23 to open and close the supply valve 20.

The exhaust valve 21 includes a valve case 29, a valve body 30, and a valve lifting rod 31. The forward end of the valve case 29 of the exhaust valve 21 is screwed into the working fluid outlet port 13. The valve case 29 has a through hole provided in an axial direction; in the through hole is a valve seat 32. In the intermediate part of the valve case 29 four openings 26a connecting the through hole with the liquid holding space 10 are provided. The valve lifting rod 31 is inserted in the through hole provided in the valve case 29 and is provided with a slot in the bottom end portion, by which the connecting plate 27 is connected. The spherical valve body 30, fixedly retained at the top end of the valve lifting rod 31, moves upward into contact with, or downward away from, the valve seat 32, thus opening and closing the exhaust valve 21. A clearance 33 is formed between the lower surface of the connecting plate 27 and the lower wall of the slot of the valve lifting rod 31.

The changeover valve 4 includes the supply valve 20 and the exhaust valve 21; when the supply valve 20 is opened by upward movement of the power transmitting shaft 28, the exhaust valve 21 closes, and when the supply valve 20 is closed, the exhaust valve 21 opens.

As shown in FIG. 2, the forced-feed liquid inlet port 16 is located near the center of the cover section 8, and the forced-feed discharge port 17 is in a position corresponding to the lower part of the hermetic vessel 2.

The float 3 is supported by a bracket 36 through a float arm 34 and a rocking shaft 35. The bracket 36 is mounted as one unit to the cover section 8 of the hermetic vessel 2 by screws (not shown). The bracket 36, when viewed from above, is composed of two "L"-shaped plates, the long portions of which are connected by a rocking shaft 35. The float arm 34 is made of a plate bent into a "U" shape, in which two plates are oppositely set in parallel, and the float 3 is connected at the one end. The float arm 34 is provided with a long hole 37, in which a shaft (or pin) 38 is mounted. The lower end of the power transmitting shaft 28 is connected to the shaft 38. The power transmitting shaft 28 has threads on its entire outside surface. The float 3 rocks up and down around the rocking shaft 35, thus moving the power transmitting shaft 28 up and down after rocking for a predetermined stroke.

Figure 4:
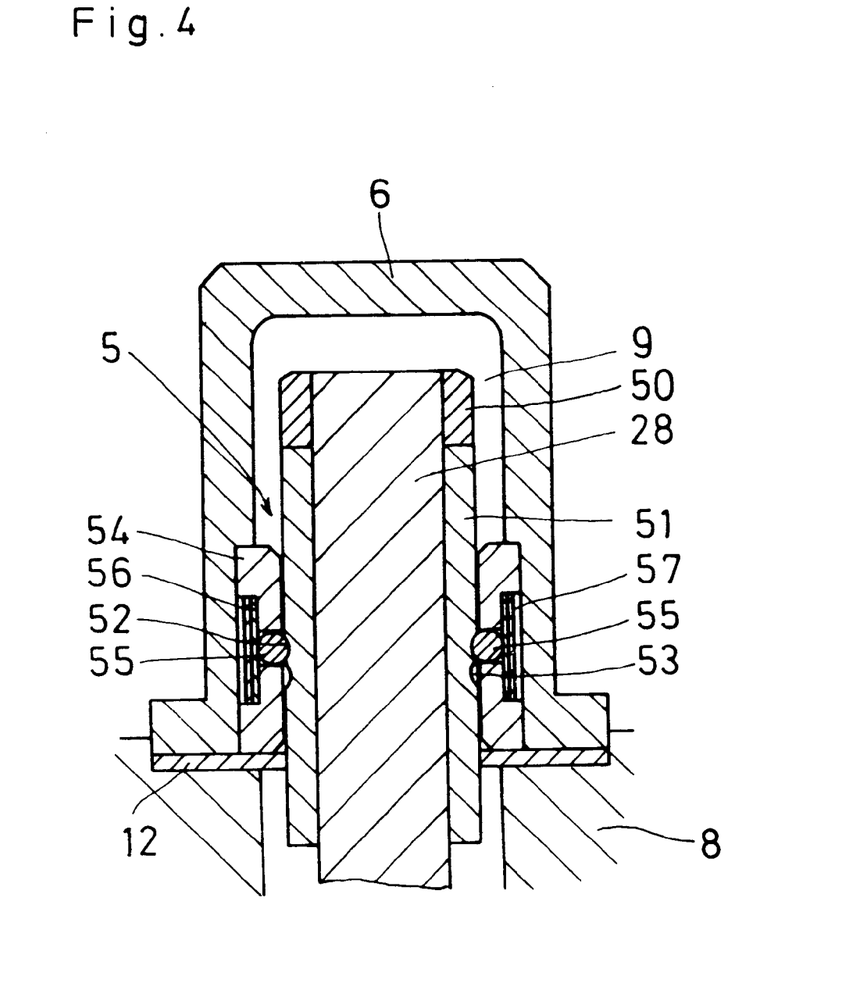
FIG. 4 is an enlarged sectional view of a snap mechanism in FIG. 2.

The top end of the power transmitting shaft 28, as shown in enlarged view FIG. 4, projects upwardly through the cover section 8 of the hermetic vessel 2 into an outside space 9 between the cover section 8 and the cap 6. A cylindrical member 51 is screwed onto the upper portion of the power transmitting shaft 28 and locked by a lock nut 50. The outer surface of cylindrical member 51 is provided with an upper annular groove 52 and a lower annual groove 53. Retaining member 54 is mounted on the outer periphery of the cylindrical member 51 and is fixed between an annular step portion of the inside wall of the cap 6 and the gasket 12. The retaining member 54 has four openings equally spaced, in each of which a locking member 55, for example, a hard ball, is inserted. Each locking member 55 is pressed into groove 52 by elastic members 56 and 57 of a "C"-sectioned ring spring. There is very little clearance between the inner periphery of the gasket 12 and the outer periphery of the cylindrical member 51, such that the fluid will not flow in or out. The snap mechanism 5 includes the grooves 52 and 53, the locking members 55, and the elastic members 56 and 57. These members are coated with grease to reduce sliding resistance.

Next, operation of the first embodiment of the liquid forced-feed apparatus 1 of the present embodiment will be explained according to a series of operating procedures in which steam is used as the working fluid. First, the external piping of the liquid forced-feed apparatus 1 is connected on the working fluid inlet port 11 side to the source of high-pressure steam, and on the working fluid discharge port 13 side to the steam circulation piping. The forced-feed liquid inlet port 16 is connected to a load, such as a steam utilizing apparatus, via a check valve (not shown) which opens towards the liquid holding space 10. The forced-feed liquid discharge port 17 is connected to liquid forcedfeed parts, such as a boiler, via a check valve (not shown) which opens outward from the liquid holding space 10.

When no condensate is present in the liquid holding space 10, the float 3 is at the bottom position as shown in FIG. 2. At this time, the supply valve 20 in the changeover valve 4 is closed while the exhaust valve 21 is open. When condensate is produced in the load, the condensate flows through the forced-feed liquid inlet port 16 and into the liquid forced-feed apparatus 1, accumulating in the liquid holding space 10.

As the float 3 rises with the accumulation of condensate in the liquid holding space 10, the float arm 34 turns clockwise on the center of the rocking shaft 35; once the shaft 38 contacts the lower end of the long hole 37, the power transmitting shaft 28 is moved upward. As the power transmitting shaft 28 is moved upward, the cylindrical member 51 moves upward together with the power transmitting shaft 28, forcing the locking member 55 out of the upper groove 52, and expanding the elastic members 56 and 57. With further upward movement of the float 3, the locking member 55 begins to go into the lower groove 53. At this point, the elastic members 56 and 57 instantly recover from deformation, quickly forcing the locking member 55 into the lower groove 53 and thereby snapping the power transmitting shaft 28 upward. As a result, the valve lifting rods 24 and 31, connected to the shaft 28, move upward so that the supply valve 20 opens and the exhaust valve 21 closes.

As the working fluid inlet port 11 opens, high pressure steam flows into the hermetic vessel 2, elevating the inside pressure. The elevated pressure discharges the accumulated condensate to the external boiler and the waste heat utilization device through the liquid forced-feed discharge port 17 via a check valve (not shown).

With the discharge of the condensate, the water level in the liquid holding space 10 goes down, lowering the float 3, and causing the float arm 34 to turn counterclockwise on the center of the rocking shaft 35. Once the shaft 38 contacts the top end of the long hole 37, the power transmitting shaft 28 is pushed downward and the cylindrical member 51 moves downward in interlock with the power transmitting shaft 28, forcing the locking member 55 out of the lower groove 53 and expanding the elastic members 56 and 57. With the further downward movement of the float 3, the locking member 55 begins to go into the upper groove 52. At this point, the elastic members 56 and 57 instantly recover from deformation, quickly forcing the locking member 55 into the upper groove 52 and thereby snapping the power transmitting shaft 28 downward. As a result, the lower surface of the connecting plate 27 contacts the lower wall of the slot of the lifting rod 31 of the exhaust valve 21, closing the supply valve 20 and opening the exhaust valve 21.

Figure 5:
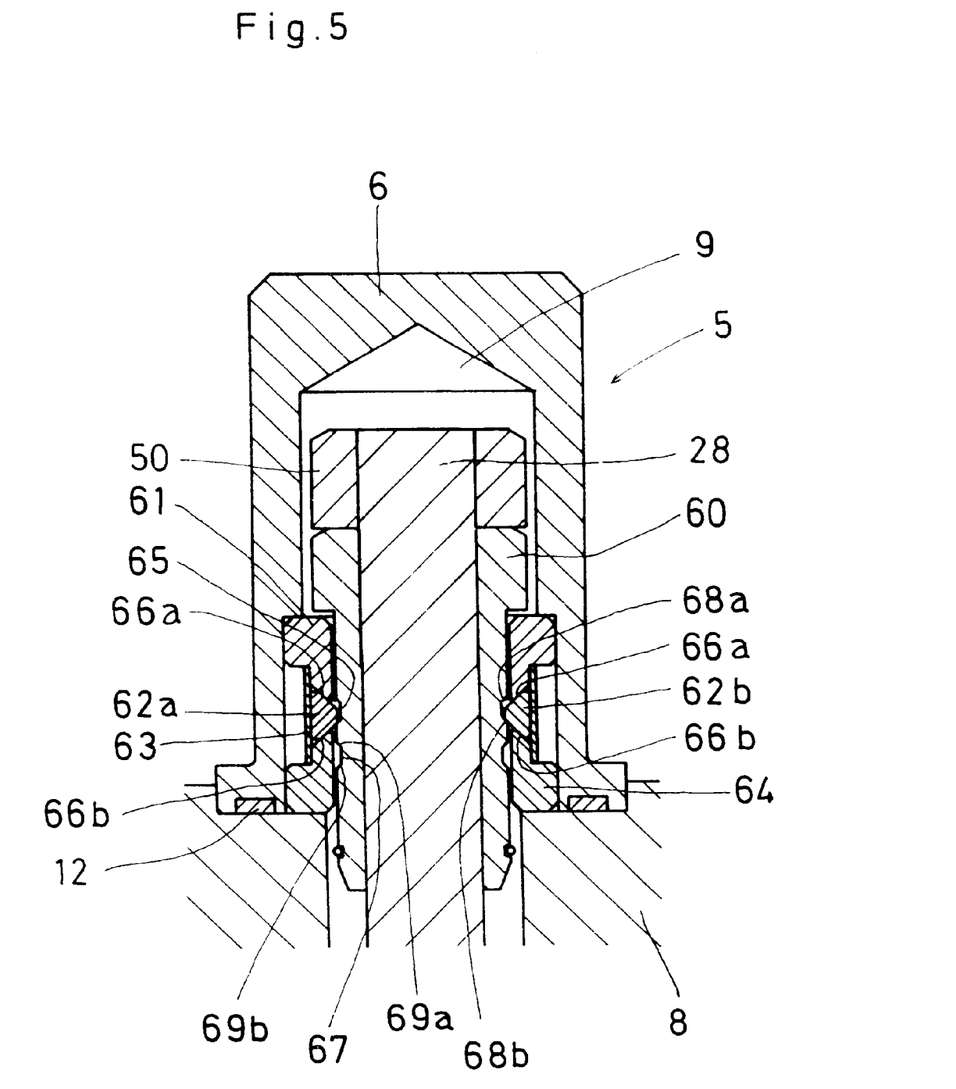
FIG. 5 is an enlarged sectional view of another embodiment of the snap mechanism.

FIG. 5 is a sectional view of a second embodiment of the liquid forced-feed apparatus according to the present invention. In the embodiment of FIG. 5, features in common with the embodiment of FIG. 4 are labeled with the same reference numerals.

A cylindrical member 60, locked by the lock nut 50, is screwed onto the upper portion of the power transmitting shaft 28. The outer surface of the cylindrical member 60 is provided with an upper annular groove 65 and a lower annular groove 67. On the outer periphery of the cylindrical member 60 are arranged an annular upper holding member 61, semi-circular locking members 62a and 62b, an elastic member 63, such as a ring spring having a "C"-shaped cross section, and an annular lower holding member 64. The locking members 62a and 62b are pressed inward by the elastic member 63, with the inner end portion being engaged in the upper groove 65 of the cylindrical member 60. The upper and lower holding members 61 and 64 are fixed between the hermetic vessel 8 and the annular step portion of the inside wall of the cap 6, and are retained by the locking members 62a and 62b between which they are interposed. The locking members 62a and 62b have, on the upper wall side, an upper inclined portion 66a which is inclined inwardly and downwardly and, on the lower wall side, a lower inclined portion 66b which is inclined inwardly and upwardly. The grooves 65 and 67 of the cylindrical member 60 have, on the upper wall side, upper inclined portions 68a and 69a which are inclined inwardly and downwardly, and, on the lower wall side, lower inclined portions 68b and 69b which are inclined inwardly and upwardly. The snap mechanism 5 is includes the grooves 65 and 67, the locking members 62a and 62b, and the elastic member 63.

When the power transmitting shaft 28 moves upward with the rise of the float, the cylindrical member 60 rises together with the power transmitting shaft 28. With the upward movement of the cylindrical member 60, the lower inclined portion 68b of the upper groove 65 slides in contact with the lower inclined portion 66b of the locking members 62a and 62b, forcing the locking members 62a and 62b outward and expanding the elastic member 63. When the lower inclined portion 68b of the upper groove 65 of the cylindrical member 60 has passed the end of the lower inclined portion 66b of the locking members 62a and 62b, locking members 62a and 62b are entirely clear of the upper groove 65 and the resistance to the upward movement is suddenly decreased, resulting in a sudden upward displacement of the power transmitting shaft 28, aided by the accumulated buoyancy of the float 3. During the sudden upward displacement of the power transmitting shaft 28, the locking members 62a and 62b begin to enter the lower groove 67 and the elastic member 63 suddenly recovers from deformation, pressing the locking members 62a and 62b into the lower groove 67. As a result, the power transmitting shaft 28 snaps upward.

On the other hand, with the downward movement of the cylindrical member 60, the upper inclined portion 69a of the lower groove 67 slides in contact with the upper inclined portion 66a of the locking members 62a and 62b, forcing the locking members 62a and 62b outward and expanding the elastic member 63. When the upper inclined portion 69a of the lower groove 67 of the cylindrical member 60 has passed the end of the upper inclined portion 66a of the locking members 62a and 62b, locking members 62a and 62b are entirely clear of the lower groove 67 and the resistance to the downward movement is suddenly decreased, resulting in a sudden downward displacement of the power transmitting shaft 28, aided by the accumulated reduction in the buoyancy of the float 3. During the sudden downward displacement of the power transmitting shaft 28, the locking members 62a and 62b begin to enter the upper groove 65 and the elastic member 63 suddenly recovers from deformation, pressing the locking members 62a and 62b into the upper groove 65. Consequently, the power transmitting shaft 28 snaps downward.

In the preceding embodiments shown in FIG. 2 to FIG. 4, the accumulated buoyancy of the float 3 is not utilized when snapping the power transmitting shaft 28. That is, with the upward movement of the cylindrical member 51, the lower outside portion of upper groove 52 slides from the lower outside surface of the locking member 55 to the central outside surface of locking member 55, thus disengaging the locking member 55 from the groove 52. In other words, the locking member 55 comes out of the groove 52 when the inclination of the tangent of the portion of the locking member 55 that contacts the groove 52 has continuously changed to be in parallel with the axial line of the power transmitting shaft 28. Therefore, the downward force of the locking member 55, which becomes resistant to the upward movement of the power transmitting shaft 28, continuously decreases to zero during the period from the beginning to the completion of disengagement and, accordingly, the accumulated buoyancy of the float 3 remains at zero.

In the embodiment of FIG. 5, however, with the upward movement of the power transmitting shaft 28, the inclined portions 66b of the locking members 62a and 62b slide on the inclined portions 69a of the grooves 65 and 67. The locking members 62a and 62b are suddenly disengaged from the grooves 65 and 67 when the degree of inclination suddenly changes and the downward force of the locking members 62a and 62b, which resists the movement of the power transmitting shaft 28, suddenly decreases. The force resulting from the buoyancy of the float 3, which has been accumulating during the process of disengagement, is discharged at once upon the completion of the disengagement, thereby further increasing the snapping motion of the power transmitting shaft 28. The present embodiment is thus effective in achieving operation of the changeover valve with a greater force.

It should be noted that in the embodiment of FIG. 5, the grooves of the cylindrical member 60 and the locking members 62a and 62b are provided with inclined portions, that the inclined portions may be formed in either or both of these elements, and that the inclined portions are not limited to flat surfaces and may have bent portions, curved portions, or a combination of both.

Figure 6:
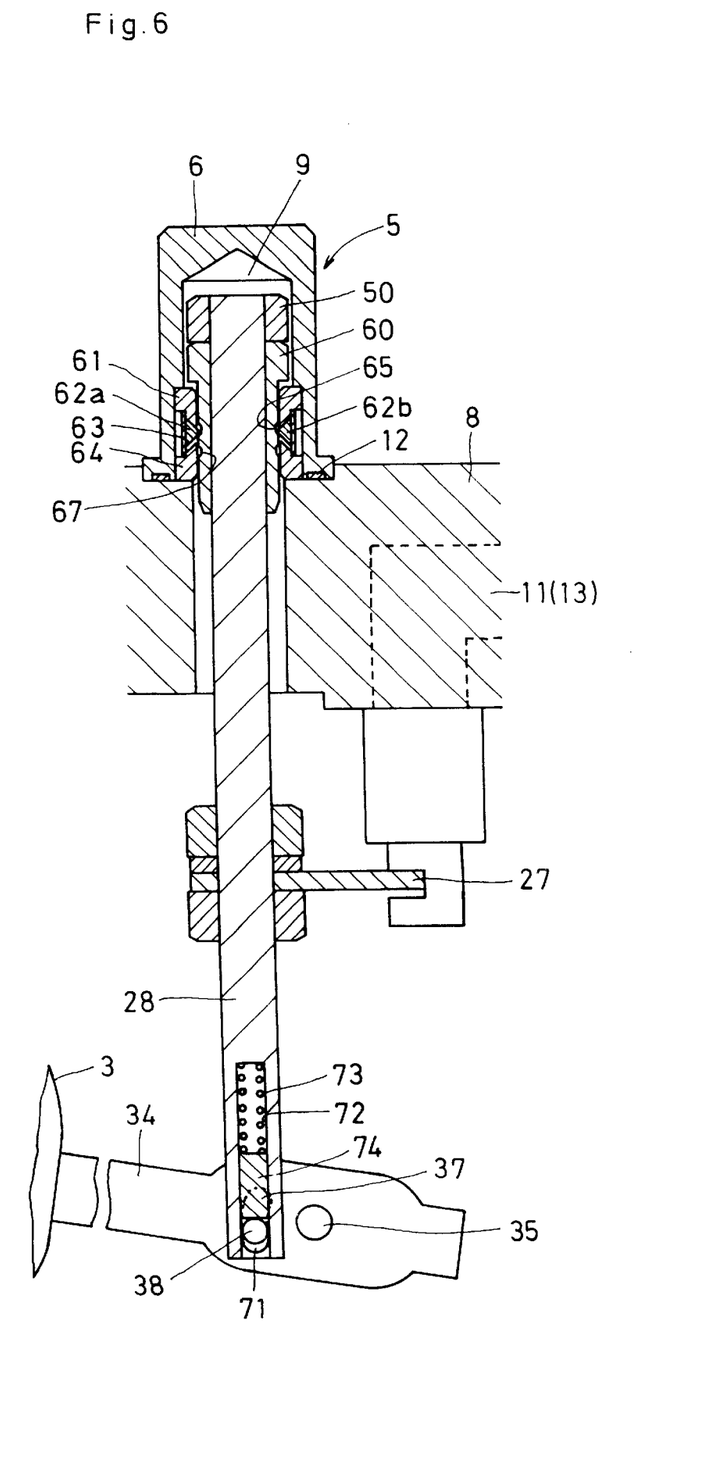
FIG. 6 is an enlarged sectional view of a float arm, a link section of a power transmitting shaft, and a snap mechanism, adopted in a second embodiment of the liquid forced-feed apparatus according to the present invention.

FIG. 6 is a sectional view of the float arm, the link of the power transmitting shaft, and the snap mechanism used in another embodiment of the liquid forced-feed apparatus according to the present invention.

In the embodiment of FIG. 6, the float arm 34 has a long hole 37, in which the shaft 38 is mounted. At the bottom end of the power transmitting shaft 28, a long hole 71 is provided through the shaft 28, from the foreground to the background in the drawing. The shaft 38 is mounted through the long hole 71, to thereby connect the lower end of the power transmitting shaft 28 to the float arm 34. In the lower portion of the power transmitting shaft 28 is formed a cylindrical deep hole 72 in the axial direction which opens upwardly from the bottom. A coil spring 73 and a cylindrical member 74 are provided in the deep hole 72; the shaft 38 is in contact, from below, with the cylindrical member 74.

As the float 3 moves upward, the float arm 34 turns clockwise on the center of the rotating shaft 35 until the lower end of the long hole 37 contacts the shaft 38. The coil spring 73 is then compressed by the upward movement of the shaft 38 and the cylindrical member 74. Once the shaft 38 contacts the upper end of the long hole 71 of the power transmitting shaft 28, the power transmitting shaft 28 is moved upward. When the float 3 moves downward, the float arm 34 turns counterclockwise on the center of the rocking shaft 35 and the upper end of the hole 37 contacts the shaft 38, pushing the power transmitting shaft 28 downward. The snap mechanism 5 is the same as that in the embodiment shown in FIG. 5.

When the float 3 moves upward, the float arm 34 turns clockwise on the center of the rotating shaft 35 until the lower end of the long hole 37 contacts the shaft 38. The coil spring 73 is then compressed by the upward movement of the shaft 38 and the cylindrical member 74. Once the shaft 38 contacts the upper end of the long hole 71 of the power transmitting shaft 28, the power transmitting shaft 28 is moved upward. The cylindrical member 60 moves upward together with the power transmitting shaft 28, and the lower inclined portion 68b of the upper groove 65 slides in contact with the lower inclined portion 66b of the locking members 62a and 62b, expanding the elastic member 63. When the lower inclined portion 68b of the upper groove 65 of the cylindrical member 60 has passed the end of the lower inclined portion 66b of the locking members 62a and 62b, locking members 62a and 62b are entirely clear of the upper groove 65 and the resistance to the upward movement is suddenly decreased, resulting in a sudden upward displacement of the power transmitting shaft 28, aided by the accumulated reduction in buoyancy of the float 3. During the sudden upward displacement of the power transmitting shaft 28, the locking members 62a and 62b begin to enter the lower groove 67 and the elastic member 63 suddenly recovers from deformation, pressing the locking members 62a and 62b into the lower groove 67. Consequently, the power transmitting shaft 28 snaps upward. During the snapping motion, the coil spring 73 that has been compressed suddenly recovers from deformation. The recovery force of the coil spring 73 increases the snapping motion of the power transmitting shaft 28.

As the float 3 goes downward, the float arm 34 turns counterclockwise on the center of the rocking shaft 35. After the upper end of the long hole 37 contacts the shaft 38, the power transmitting shaft 28 is pushed downward. The cylindrical member 60 moves downward together with the power transmitting shaft 28, and the upper inclined portion 69a of the lower groove 67 slides in contact with the upper inclined portion 66a of the locking members 62a and 62b, forcing the locking members 62a and 62b outward and expanding the elastic member 63. When the upper inclined portion 69a of the lower groove 67 of the cylindrical member 60 has passed the end of the upper inclined portion 66a of the locking members 62a and 62b, locking members 62a and 62b are entirely clear of the lower groove 67 and the resistance to the downward movement is suddenly decreased, resulting in a sudden downward displacement of the power transmitting shaft 28, aided by the accumulated reduction in buoyancy of the float 3. During the sudden downward displacement of the power transmitting shaft 28, the locking members 62a and 62b begin to enter the upper groove 65 and the elastic member 63 suddenly recovers from deformation, pressing the locking members 62a and 62b into the upper groove 65. Consequently, the power transmitting shaft 28 snaps downward.

During the snapping motion, the coil spring 73, which has been compressed, suddenly recovers from deformation. The recovery force of the coil spring 73 increases the snapping motion of the power transmitting shaft 28.

Figure 7:
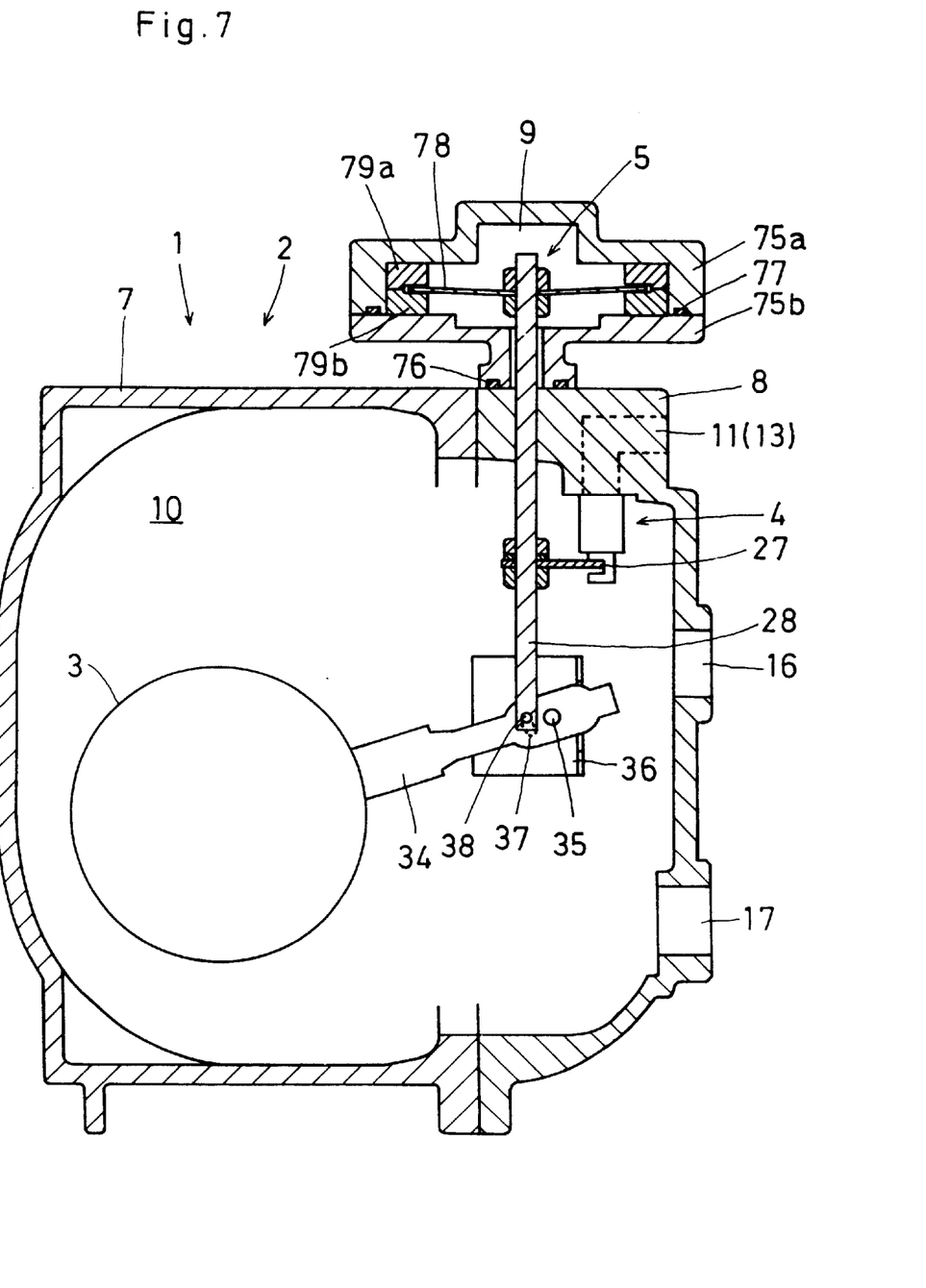
FIG. 7 is a sectional view of a third embodiment of the liquid forced-feed apparatus according to the present invention.

FIG. 7 is a sectional view of another embodiment of the liquid forced-feed apparatus according to the present invention. In FIG. 7, the snap mechanism 5 is disposed in the outside space 9 between the cover section 8 and the housing members 75a and 75b. The cover section 8 and the housing member 75 are connected by screws (not shown) and the housing member 75a and the housing member 75b are connected by screws (not shown). Between the cover section 8 and the housing member 75a, and between the housing member 75a and the housing member 75b, are interposed gaskets 76 and 77, respectively, for maintaining airtightness.

The center of a reversing plate spring 78 is connected on the upper portion of the power transmitting shaft 28. The reversing plate spring 78 is a convex disk with a hole at center. The power transmitting shaft 28 is inserted through the hole in the center of the reversing plate spring 78, and is fixed on the power transmitting shaft 28 by upper and lower nuts. The periphery of the reversing plate spring 78 is held by the holding members 79a and 79b sandwiched between the housing members 75a and 75b. The power transmitting shaft 28 and the reversing plate spring 78 make up the snap mechanism 5.

When no condensate is present in the liquid holding space 10 of the embodiment of FIG. 7 of the liquid forced-feed apparatus 1, the float 3 is in the bottom position as shown in FIG. 7. At this point, the reversing plate spring 78 is curved such that its concave side faces up. When the power transmitting shaft 28 moves upward with the rise of the float 3, the central portion of the reversing plate spring 78 is pushed upward. Immediately before the center of the reversing plate 78 reaches an intermediate point, the reversing plate spring 78 quickly reverses, such that it becomes convex on its top side, thereby snapping the power transmitting shaft 28 upward.

When the power transmitting shaft 28 moves downward with the downward movement of the float 3, the central portion of the reversing plate spring 78 is pulled downward. Immediately before the center of the reversing plate 78 reaches an intermediate point, the reversing plate spring 78 quickly reverses, such that it becomes concave on its top side, thereby snapping the power transmitting shaft 28 downward.

The snap mechanism of the present embodiment, having a small number of components, is simply constructed.

Figure 8:
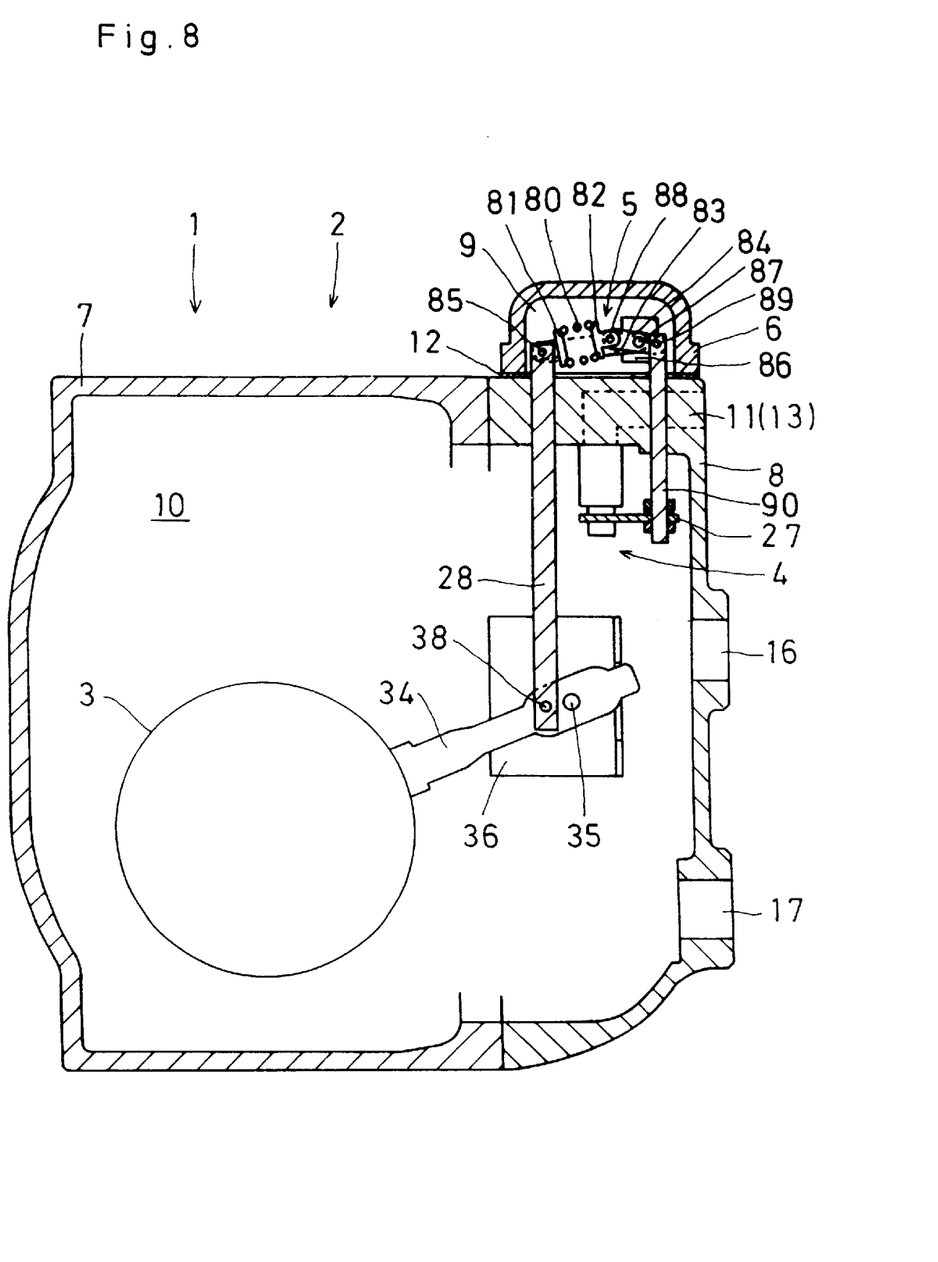
FIG. 8 is a sectional view of a fourth embodiment of the liquid forced-feed apparatus according to the present invention.

FIG. 8 is a sectional view of another embodiment of the liquid forced-feed apparatus according to the present invention. In FIG. 8, the snap mechanism 5 of the present embodiment, which is disposed in an outside space 9 between the cover section 8 and the cap 6, includes of a coil spring 80 in a compressed state, spring receiving members 81 and 82, a first arm 83, and a second arm 84.

A shaft 85 is mounted on the top end of the power transmitting shaft 28 protruding upwardly from the cover section 8 of the hermetic vessel 2. The spring receiving member 81 is rotatably supported on the shaft 85. The left end portion of the first arm 83, including two plates arranged in parallel, is also rotatably supported on the shaft 85. The right end portion of the first arm 83 is rotatably supported on a shaft 87, which is supported on a bracket 86 mounted integrally on the cap 6. The midpoint portion of the second arm 84, consisting of two plates arranged in parallel, is rotatably supported on the shaft 87. At the left end portion of the second arm 84, a shaft 88 is mounted. The spring receiving member 82 is rotatably supported on the shaft 88. The coil spring is mounted, in a compressed state, between the spring receiving members 81 and 82. A shaft 89 is mounted on the right end portion of the second arm 84, and the top end of a valve stem operating rod 90 is also connected with the shaft 89. The valve stem operating rod 90 is extended through the cover section 8 into the hermetic vessel 2. The connecting plate 27 is connected to the bottom end of the operating rod 90 and the changeover valve 4 is connected to the connecting plate 27. There is very little clearance between the power transmitting shaft 28 and the cover section 8, and between the valve stem operating rod 90 and the cover section 8, such that the fluid will not flow in or out.

When the power transmitting shaft 28 moves upward with the rise of the float 3, the first arm 83 rotates clockwise on the center of the shaft 87, moving the shaft 85, in connection with the coil spring 80, close to the line of connection between the shaft 87 and the shaft 88, thus compressing the coil spring 80. With the further rise of the float 3, the shaft 85 crosses over the line of connection between the shaft 87 and the shaft 88, causing the coil spring 80 to suddenly recover from compression. The sudden recovery of the coil spring 80 causes the second arm 84 to rotate counterclockwise on the center of shaft 87, quickly moving the shaft 89 upward. Consequently, the valve stem operating rod 90, which is connected with the shaft 89, snaps up, operating the changeover valve 4 through the connecting plate 27.

When the power transmitting shaft 28 is pushed downward with the downward movement of the float 3, the first arm 83 rotates counterclockwise around the shaft 87, moving the shaft 85, in connection with the coil spring 80, close to the line of connection between the shaft 87 and the shaft 88, thus compressing the coil spring 80. With the further descent of the float 3, the shaft 85 crosses under the line of connection between the shaft 87 and the shaft 88, causing the coil spring 80 to suddenly recover from compression. The sudden recovery of the coil spring 80 causes the second arm 84 to rotate clockwise on the center of shaft 87, quickly moving the shaft 89 downward. Consequently, the valve stem operating rod 90, which is connected with the shaft 89, snaps down, operating the changeover valve 4 through the connecting plate 27.

In the above description of the invention, those skilled in the art will perceive improvements, changes and modifications. Improvements, changes and modifications within the skill of the art are intended to be covered by the claims.

What is claimed is:

1. A liquid forced-feed apparatus comprising:
   a vessel including a working fluid inlet port, a working fluid discharge port, a liquid inlet port, a liquid discharge port;
   a float;
   a power transmitting shaft, the power transmitting shaft extending outside of the vessel, the float connected to the power transmitting shaft; and
   a snap mechanism located outside the vessel, the snap mechanism operating a change-over valve, the change-over valve including a working fluid feed valve at the working fluid inlet port and a working fluid discharge valve at the working fluid discharge port, the working fluid feed valve opening the working fluid inlet port and the working fluid discharge valve closing the working fluid discharge port with movement in a first direction of the power transmitting shaft, and the working fluid feed valve closing the working fluid inlet port and the working fluid discharge valve opening the working fluid discharge port with movement in a second direction of the power transmitting shaft.

2. The liquid forced-feed apparatus of claim 1, wherein:
   the change-over valve is connected to the power transmitting shaft.

3. The liquid forced-feed apparatus of claim 1, further comprising:
   a float arm pivotally mounted in the vessel, the float connected to the float arm and the float arm connected to the power transmitting shaft.

4. The liquid forced-feed apparatus of claim 3, wherein:
   the float arm includes an elongated hole, and wherein a pin connects the power transmitting shaft and the float arm through the elongated hole.

5. The liquid forced-feed apparatus of claim 3, wherein:
   the power transmitting shaft includes a first elongated hole, the float arm includes a second elongated hole, and wherein a pin connects the power transmitting shaft and the float arm through the elongated holes.

6. The liquid forced-feed apparatus of claim 5, further comprising:

an elastic member between the power transmitting shaft and the float, the elastic member being compressed by movement of the float.

7. The liquid forced-feed apparatus of claim 6, wherein:

the elastic member is a compression spring located in an axial bore in the power transmitting shaft.

8. The liquid forced-feed apparatus of claim 1, wherein:

the snap mechanism includes two annular grooves provided on the surface of the power transmitting shaft, an elastic member, a locking member pressed by the elastic member into one of the grooves of the power transmitting shaft.

9. The liquid forced-feed apparatus of claim 8, wherein:

the locking member includes inclined portions for disengaging the locking member from the grooves.

10. The liquid forced-feed apparatus of claim 8, wherein:

the grooves include inclined portions for disengaging the locking member from the grooves.

11. The liquid forced-feed apparatus of claim 8, wherein:

the locking member and the grooves include inclined portions for disengaging the locking member from the grooves.

12. The liquid forced-feed apparatus of claim 8, wherein:

the elastic member is a "C"-sectioned ring spring.

13. The liquid forced-feed apparatus of claim 1, further comprising:

an elastic member provided between the float and the power transmitting shaft and compressed by movement of the float.

14. The liquid forced-feed apparatus of claim 13, wherein:

the elastic member is a compression spring located in an axial bore in the power transmitting shaft.

15. The liquid forced-feed apparatus of claim 1, wherein:

the snap mechanism includes a reversing plate spring connected at its center to the power transmitting shaft and at its outer edge to the vessel.

16. The liquid forced-feed apparatus of claim 15, wherein:

the reversing plate spring is located inside a housing formed of a cover section and a base section.

17. The liquid forced-feed apparatus of claim 1, wherein:

the snap mechanism includes an elastic member, a first arm and a second arm, the first arm pivotally connected at one end to both the power transmitting shaft and the elastic member and at another end to the vessel, the second arm connected at one end to the elastic member and at another end to a valve operating rod.

18. A snap mechanism comprising:

a power transmitting shaft, two annular grooves provided on the surface of the power transmitting shaft, an elastic member, and a locking member pressed by the elastic member into one of the grooves of the power transmitting shaft.

19. The snap mechanism of claim 18, wherein:

the locking member includes inclined portions for disengaging the locking member from the grooves.

20. The snap mechanism of claim 18, wherein:

the grooves include inclined portions for disengaging the locking member from the grooves.

21. The snap mechanism of claim 18, wherein:

the locking member and the grooves include inclined portions for disengaging the locking member from the grooves.

22. The snap mechanism of claim 18, wherein:

the elastic member is a "C"-sectioned ring spring.

23. A snap mechanism comprising:

a power transmitting shaft and a reversing plate spring, the reversing plate spring connected at its center to a power transmitting shaft and fixed at its outer edge.

24. The snap mechanism of claim 23, wherein:

the reversing plate spring is located inside a housing formed of a cover section and a base section.

25. A liquid forced-feed apparatus comprising:

a vessel including a working fluid inlet port, a working fluid discharge port, a liquid inlet port, a liquid discharge port;

a float;

a power transmitting shaft, the float connected to the power transmitting shaft; and a snap mechanism including two annular grooves provided on the surface of the power transmitting shaft, an elastic member, and a locking member pressed by the elastic member into one of the grooves of the power transmitting shaft, wherein the snap mechanism operates a change-over valve, the change-over valve including a working fluid feed valve at the working fluid inlet port and a working fluid discharge valve at the working fluid discharge port, the working fluid feed valve opening the working fluid inlet port and the working fluid discharge valve closing the working fluid discharge port with movement in a first direction of the power transmitting shaft, and the working fluid feed valve closing the working fluid inlet port and the working fluid discharge valve opening the working fluid discharge port with movement in a second direction of the power transmitting shaft.

26. The liquid forced-feed apparatus of claim 25, wherein:

the locking member includes inclined portions for disengaging the locking member from the grooves.

27. The liquid forced-feed apparatus of claim 25, wherein:

the grooves include inclined portions for disengaging the locking member from the grooves.

28. The liquid forced-feed apparatus of claim 25, wherein:

the locking member and the grooves include inclined portions for disengaging the locking member from the grooves.

29. The liquid forced-feed apparatus of claim 25, wherein:

the elastic member is a "C"-sectioned ring spring.

30. A liquid forced-feed apparatus comprising:

a vessel including a working fluid inlet port, a working fluid discharge port, a liquid inlet port, a liquid discharge port;

a float;

a power transmitting shaft, the float connected to the power transmitting shaft; and a snap mechanism including a reversing plate spring connected at its center to the power transmitting shaft and at its outer edge to the vessel, wherein the snap mechanism operates a change-over valve, the change-over valve including a working fluid feed valve at the working fluid inlet port and a working fluid discharge valve at the working fluid discharge port, the working fluid feed valve opening the working fluid inlet port and the working fluid discharge valve closing the working fluid discharge port with movement in a first direction of the power transmitting shaft, and the working fluid feed valve closing the working fluid inlet port and the working fluid discharge valve opening the working fluid discharge port with movement in a second direction of the power transmitting shaft.

31. The liquid forced-feed apparatus of claim 30, wherein:
the reversing plate spring is located inside a housing formed of a cover section and a base section.

32. A liquid forced-feed apparatus comprising:
a vessel including a working fluid inlet port, a working fluid discharge port, a liquid inlet port, a liquid discharge port;
a float;
a power transmitting shaft, the float connected to the power transmitting shaft;
an elastic member disposed between the float and the power transmitting shaft; and
a snap mechanism located outside the vessel and connected to the power transmitting shaft, the snap mechanism operating a change-over valve, the change-over valve including a working fluid feed valve at the working fluid inlet port and a working fluid discharge valve at the working fluid discharge port, the working fluid feed valve opening the working fluid inlet port and the working fluid discharge valve closing the working fluid discharge port with movement in a first direction of the power transmitting shaft, and the working fluid feed valve closing the working fluid inlet port and the working fluid discharge valve opening the working fluid discharge port with movement in a second direction of the power transmitting shaft.

33. The liquid forced-feed apparatus of claim 32, wherein:
the elastic member is a compression spring located in an axial bore in the power transmitting shaft.

* * * * *